US 12,450,119 B2

(12) United States Patent
Djurdjevic et al.

(10) Patent No.: US 12,450,119 B2
(45) Date of Patent: Oct. 21, 2025

(54) MINIMIZING REDUNDANCY FOR STUCK BIT CODING

(71) Applicant: WESTERN DIGITAL TECHNOLOGIES, INC., San Jose, CA (US)

(72) Inventors: Ivana Djurdjevic, San Jose, CA (US); Cyril Guyot, San Jose, CA (US); Robert Mateescu, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/533,655

(22) Filed: Dec. 8, 2023

(65) Prior Publication Data

US 2025/0190302 A1    Jun. 12, 2025

(51) Int. Cl.
G06F 11/10 (2006.01)

(52) U.S. Cl.
CPC ........ G06F 11/1068 (2013.01); G06F 11/102 (2013.01)

(58) Field of Classification Search
None
See application file for complete search history.

(56) References Cited

U.S. PATENT DOCUMENTS

| | | | |
|---|---|---|---|
| 7,069,494 B2 | 6/2006 | Cargnoni | |
| 8,261,167 B1 * | 9/2012 | Northcott | H03M 13/152 |
| | | | 714/758 |
| 8,910,028 B1 * | 12/2014 | Li | H03M 13/23 |
| | | | 714/752 |
| 10,528,419 B2 | 1/2020 | Davis | |
| 10,679,718 B2 | 6/2020 | Ghaly | |
| 12,212,338 B1 * | 1/2025 | Lien | H03M 13/1108 |
| 2013/0173990 A1 * | 7/2013 | Li | G11B 20/1833 |
| | | | 714/763 |

(Continued)

OTHER PUBLICATIONS

H. Al Kim, S. Puchinger and A. Wachter-Zeh, "Error Correction for Partially Stuck Memory Cells," 2019 XVI International Symposium "Problems of Redundancy in Information and Control Systems" (Redundancy), Moscow, Russia, 2019, pp. 87-92, (Year: 2019)*

(Continued)

Primary Examiner — Daniel F. McMahon
(74) Attorney, Agent, or Firm — Barry IP Law, P.C.

(57) ABSTRACT

A storage device minimizes redundancy for stuck bit codes when writing a message to a memory device. A controller generates a set of masks that are codewords and that include values that correspond to stuck bit values. The set of masks may include full length codewords or shortened codewords. When the controller receives a message including a predefined number of label bits and determines that a location in the memory device where the message is be stored includes two stuck bits, the controller encodes the message to produce a first message codeword. The controller then locates a mask from the set of masks, wherein when the mask is added to the first message codeword, any two stuck message bits are masked. The controller computes a final message codeword using the first message codeword and the mask and stores the final message codeword on the memory device.

19 Claims, 7 Drawing Sheets

(56) References Cited

U.S. PATENT DOCUMENTS

| | | | | |
|---|---|---|---|---|
| 2014/0331101 | A1* | 11/2014 | Chung | G06F 11/1008 |
| | | | | 714/755 |
| 2017/0366199 | A1* | 12/2017 | Ge | H03M 13/09 |
| 2020/0195275 | A1* | 6/2020 | Chow | H03M 13/158 |
| 2025/0045156 | A1* | 2/2025 | Zlotnik | G06F 11/1004 |

OTHER PUBLICATIONS

Al Kim, Haider, Sven Puchinger and Antonia Wachter-Zeh; Error Correction for Partially Stuck Memory Cells, 2019, XVI International Symposium, Oct. 21, pp. 87-92. IEEE.

Wachter-Zeh, Antonia and Eitan Yaak; Codes for Partially Stuck-at Memory Cells, 2015, IEEE Transactions on Information Theory 62, No. 2, pp. 639-654.

* cited by examiner

MINIMIZING REDUNDANCY FOR STUCK BIT CODING

BACKGROUND

Non-volatile storage devices, such as solid-state drives (SSD) and the like, may include one or more memory devices for storing data and a controller for managing the internal operations of the storage device. To write data to the memory device, the controller may send signals representing a binary bit (0 or 1) to program individual memory cells. Over time the memory device may experience wear that may result in permanent failures (also referred to herein as stuck errors or defect errors). When a stuck error occurs, a position (bit) on the memory device may be stuck at a value that cannot be changed. The stuck error may also occur in a range of positions on the memory device. The value of a bit that cannot be changed may be referred to herein as a stuck bit value and the bit with the stuck bit value may be referred to herein as a stuck bit. For example, a stuck bit having a stuck bit value of 1 cannot be changed when the value of the bit is overwritten with a 0.

When the controller determines that there is a stuck bit in a location on the memory device where the controller is trying to write data, the controller may obtain side information about the stuck bit. The side information may include the location of the stuck bit and the stuck bit value. The controller may use the side information at the time of encoding the original data (also referred to herein as a message) into the memory device and the controller may manipulate the content of the original data being written to the memory device so that manipulated data being written to the location including the stuck bit corresponds with the stuck bit value. To properly decode the manipulated data and return the original message when the manipulated data is read from the memory device, the controller may store extra bits for the side information with the manipulated data. When the controller reads the manipulated data, the controller may use the extra bits generated for the side information to decode the manipulated data and recover the original message.

To avoid storing the extra bits generated for the side information, a current implementation performs extra computation to deal with stuck bits without storing the side information. The original message may be encoded for random errors and an encoding mask may be applied to the encoded data to produce a codeword, wherein when the encoding mask is added to the codeword, the result has the appropriate struck bit values at stuck bit positions. On the decoding side, a decoder may retrieve a codeword with some errors. The decoder may generate a list of decoding masks, including the encoding mask, that are not codewords. Only the encoding mask from the list of decoding masks may decode the retrieved codeword with errors to return the codeword with the original message or to return to a code space around the codeword with the original message. During decoding, the decoder may add the masks from the list to the retrieved codeword with errors. Adding a decoding mask that is not a codeword or a sum of two decoding masks that are not codewords to the retrieved codeword may have unknown properties which may increase the rate of miscorrection (i.e., decoding to the wrong codeword or the code space of the wrong codeword). In some instances, an increased rate of miscorrection may be unacceptable.

An implementation may perform stuck-bit coding without increasing the rate of miscorrection by using codewords as decoding masks. The masks in this implementation may include label bits for labeling the masks. The encoder may find an appropriate mask to account for struck bits. The decoder may use the label to identify the appropriate masks to be added to the encoded codeword. While this approach solves the problem of miscorrection, it involves storing the label with the message. In an example, to find masks that are codewords, when a message is to be stored in a location with one stuck bit, the encoder may receive the message of length k−1. The encoder may compute a first codeword corresponding to the message with only one zero appended. If a position in the first codeword matches the stuck bit value, the label for the mask may be set to zero, otherwise, the label may be set to one. The encoder may compute a second codeword including an inverted value of the first codeword, when the label may be set to one. The decoder may decode the codeword plus an error, and if the decoding is successful, the decoder may retrieve a value from a position k−1 in the decoded codeword (with positions numbered from 0), i.e., the label position. If the value retrieved from the label position, k−1, is one, the decoder may add a mask of ones to the decoded codeword and obtain the message. This stuck-bit coding may only work for full-length Chaudhuri-Hocquenghem (BCH) codes and may not work for shortened codes that may be more commonly used in practice.

SUMMARY

In some implementations, a storage device may minimize redundancy for stuck bit codes when writing a message to a memory device and reading the message from the memory device. The storage device includes a controller that may generate a set of masks that are codewords and that include values that correspond to stuck bit values. The set of masks may include full length codewords or shortened codewords. When the controller receives a message including a predefined number of label bits and determines that a location in the memory device where the message is be stored includes two stuck bits, the controller encodes the message to produce a first message codeword. The controller then locates a mask from the set of masks, wherein when the mask is added to the first message codeword, any two stuck message bits are masked. The controller computes a final message codeword using the first message codeword and the mask and stores the final message codeword on the memory device. When the controller retrieves the final message codeword and errors from the memory device, the controller decodes the final message codeword to retrieve an output, obtains a mask label from the output, uses the mask label to retrieve the mask, and applies the mask to the output to retrieve the message.

In some implementations, a method is provided for minimizing redundancy for stuck bit codes when writing a message to a memory device communicatively coupled to a storage device. The method includes generating a set of masks that are codewords and that include values that correspond to stuck bit values. The set of masks includes full length codewords or shortened codewords. The method also includes receiving a message including a predefined number of label bits and determining that a location in the memory device where the message is to be stored includes two stuck bits. The method also includes encoding the message to produce a first message codeword, locating a mask from the set of masks wherein when the mask is added to the first message codeword, any two stuck message bits are masked, computing a final message codeword using the first message codeword and the mask, and storing the final message codeword on the memory device.

In some implementations, a method is provided for minimizing redundancy for stuck bit codes when retrieving a message from a memory device communicatively coupled to a storage device. The method includes generating a set of masks that are codewords and that include values that correspond to stuck bit values. The set of masks includes full length codewords or shortened codewords. The method also includes retrieving a message codeword and errors from the memory device and decoding the message codeword to retrieve an output. The method further includes obtaining a mask label from the output, using the mask label to retrieve a mask from the set of masks; and applying the mask to the output to retrieve a message.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
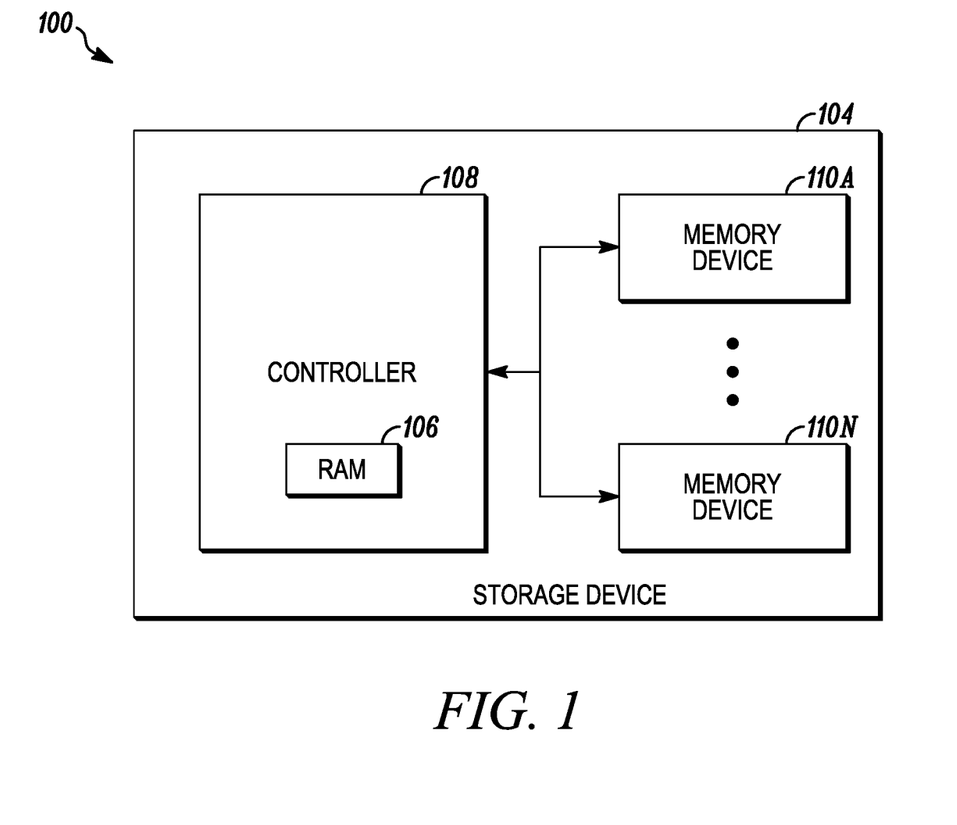
FIG. 1 is a schematic block diagram of an example storage device in accordance with some implementations.

FIG. 1 is a schematic block diagram of an example storage device in accordance with some implementations. Storage device 104 may include a random-access memory (RAM) 106, a controller 108, and one or more non-volatile memory devices 110*a*-110*n* (referred to herein as the memory device(s) 110). Storage device 104 may be, for example, a solid-state drive (SSD), and the like. RAM 106 may be temporary storage such as a dynamic RAM (DRAM) that may be used to cache information in storage device 104.

Controller 108 may interface with a host device and process foreground operations including instructions transmitted from the host device. For example, controller 108 may read data from and/or write to memory device 110 based on instructions received from the host device. Controller 108 may also execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based, a phase-change memory (PCM), or the like. Memory device 110 may be used for storing host and control data over the operational life of memory device 110. Memory device 110 may be divided into blocks and data may be stored in the blocks in various formats, with the formats being defined by the number of bits that may be stored per memory cell. Formats storing fewer bits in each cell are more easily accessed, durable, and less error-prone than formats storing more bits per cell. However, formats storing fewer bits in each cell are also more expensive.

In some cases, memory device 110 may have defects in one or more cell locations and the bit stored in a defective location may be a stuck bit, wherein the value of the bit cannot be changed when it is overwritten with other data. In encoding, for example, host data (also referred to herein as a message) on memory device 110, controller 108 may encode the message with cyclic error-correcting codes. Controller 108 may produce a codeword (also referred to herein as an encoded message) with cyclic or quasi-cyclic properties such that a shifted code remains in a code space.

When controller 108 wants to store the encoded message including redundancy bits, controller 108 may determine whether locations on memory device 110 where the encoded message is to be stored include stuck bits. When the encoded message is to be stored in a location on memory device 110 with two stuck bits, controller 108 may generate a set of masks, M, that may not necessarily be codewords. The masks may only be constrained by the number of stuck bits to be corrected, wherein the values in the masks may correspond with the struck bit values. The masks may be at least k bits long, wherein k may be the length of the encoded message and the masks may cover the k message bits so that any two stuck message bits may be masked properly.

For full-length codewords, controller 108 may encode all the masks once and cyclically shift each codeword three times to obtain a set of masks that are codewords and that cover all the stuck bit combinations. If the codeword has a length of n where n may be larger than k, controller 108 may encode the masks, M, by adding parity. For example, controller 108 may encode the masks by adding parity to the front of the masks, such that the first predefined number of bits (i.e., n–k bits) of the encoded masks may have the parity and the remaining k bits of the codeword may be the masks. The positions in the codewords without the parity may cover the message so that any two stuck message bits may be properly masked. For example, when the parity is at the front of the masks, the masks may handle any two stuck bits in the sections of the masks (i.e., the remaining k-bit sections of the masks) that do not have the parity.

To ensure that all positions of the message are covered by positions in the codewords without the parity, controller 108 may obtain extra masks by shifting the encoded masks. For example, controller 108 may shift the codewords such that parity may be at the end and any two stuck message bits may be properly masked by positions in the masks without the parity. In this case, the first k bits of the codeword may include the masks.

It may be possible to have two stuck bits wherein one struck bit may be in the beginning of the codeword, and one stuck bit may be at the end, and neither of the codewords having the parity in the beginning or at the end may cover these stuck bit positions. Controller 108 may shift the codewords such that parity may be in the middle so that any two stuck message bits at the front and at the back of the codeword may be properly masked by positions in the masks without the parity.

For shortened codes, controller 108 may encode each mask in a set of masks three times. During the first encoding, controller 108 may encode a mask (i) by adding a first parity, pi (1), to the front of the mask (i), such that the first predefined number of bits (i.e., n–k bits) may have the first parity and the remaining k bits may have the masks. In this case, some of the remaining k bit may be unused and may be of a length $k_{short}$ wherein those unused bits may have zeros and may be unused on memory device 110. During the second encoding, controller 108 may encode mask (i) by adding a second parity, pi (2), to the front of mask (i), a number of unused bits of length $k_{short}$ after the second parity, and mask (i) after the unused bits. When the codeword is cyclic shifted, mask (i) may be at the front of the shortened codeword, and the second parity may be at the back of the shortened codeword. During the third encoding, controller 108 may encode mask (i) by dividing the mask into two. Controller 108 may encode mask (i) by adding a third parity, pi (3), the second half of mask (i) after the third parity, the unused bits of length $k_{short}$ after the second half of mask (i), and the first half of mask (i) after the unused bits. When the codeword is cyclic shifted, the first half of mask (i), the third parity, and the second half of mask (i) may cover the shortened codeword. The first, second, and third sets of parity may have different values.

After controller 108 has obtained a set of masks that are codewords and that cover all stuck bit combinations, controller 108 may perform a search to remove some unnecessary masks and reduce the total number of masks. Controller 108 may store a predefined number (represented by l) of label bits among message bits. Controller 108 may reduce the message portion by l and use l bits as labels in the masks. When, for example, l is five, controller 108 may generate labels for thirty-two masks such that each mask label may have a different value and each mask may have a different label.

During encoding, controller 108 may receive a message, m, that may be of length k–L, wherein L may be the number of label bits, wherein m=[$m_0$ $m_1$ ... $m_{k-L-1}$]. The message may include stuck bits in positions i and j and stuck bit values $s_i$ and $s_j$. Controller 108 may store a set of masks that are codewords and that cover all possible two stuck bits positions and values. Controller 108 may also store a set of label bit positions ($l_0$, $l_1$, ..., $l_{L-1}$) to cover the labels for the set of masks. Controller 108 may form an extended message, $m_e$, by inserting zeros in the label bit positions, where $m_e$=[$m_{e,0}$ $m_{e,1}$ ... $m_{e,k-1}$], such that at every $l_i$, there is a zero.

Controller 108 may compute a first codeword (also referred to herein as a first message codeword), v, corresponding to the extended message, $m_e$, and added parity, where v=$m_e$·G=[$m_e$ p]. Controller 108 may find a mask z, such that for any positions i and j, $v_i$+$z_i$=$s_i$ and $v_j$+$z_j$=$s_j$, satisfying the stuck bit values. Controller 108 may then compute a final message codeword, c, using the first message codeword and the mask to yield c=v+z. Controller 108 may then store the final message codeword on memory device 110.

During decoding, controller 108 may receive the codeword plus errors. Controller 108 may decode the codeword plus errors and, if the decoding is unsuccessful, declare a failure. If the decoding is successful, controller 108 may return an output, ĉ, and obtain the mask label from the output, i.e., [$ĉ_{l_0} ĉ_{l_2}$, ... $ĉ_{l_{L-1}}$]. Controller 108 may find the mask, z, that corresponds to the label and add the mask to ĉ to obtain v̂, wherein v̂=ĉ+z. Controller 108 may obtain an estimate of the message from v̂.

Controller 108 may thus perform an effective search for masks covering full length codes and shortened codes. Controller 108 may also execute stuck bit coding that can correct up to two stuck bit errors in addition to correcting random errors in the underlying code. By storing the masks labels with the message and adding relatively few additional computations to the encoder and decoder, controller 108 may execute a method that does not increase the miscorrection rate or otherwise reduce the error correction capability.

Storage device 104 may perform these processes based on a processor, for example, controller 108 executing software instructions stored by a non-transitory computer-readable medium. As used herein, the term "computer-readable medium" refers to a non-transitory memory device. Software instructions may be read into the memory device from another computer-readable medium or from another device. When executed, software instructions stored in the memory device may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, storage device 104 may include additional components, fewer components, different components, or differently arranged components than those shown in FIG. 1. Additionally, or alternatively, a set of components (e.g., one or more components) of storage device 104 may perform one or more functions described as being performed by another set of components of storage device 104.

Figure 2:
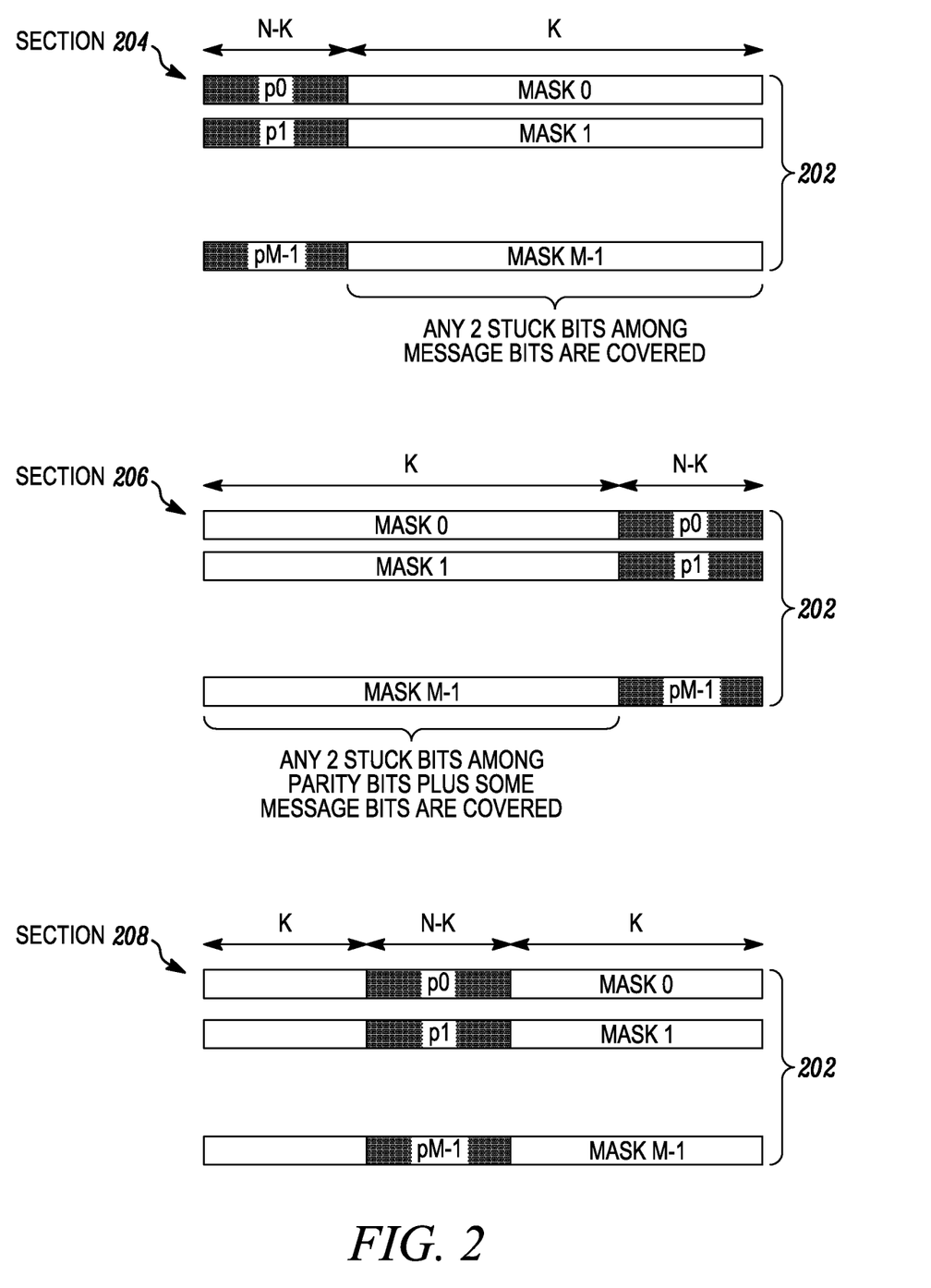
FIG. 2 shows an example of masks encoded to produce full-length codewords, in accordance with some embodiments.

FIG. 2 shows an example of masks encoded to produce full-length codewords, in accordance with some embodiments. Controller 108 may encode all the masks (i.e., mask 0–mask M–1) once. If codeword 202 has a length of n where n may be larger than a message length equals to k, controller 108 may encode mask 0–mask M–1 by adding parity (i.e., p 0–p M–1). For example, for the set of masks 0–mask M–1 in section 204, controller 108 may encode the mask 0–mask M–1 by adding p 0–p M–1 to the front of mask 0–mask M–1, such that the first n–k bits of the codewords may have the parity and the remaining k bits of the codewords may be the mask 0–mask M–1. The positions in the codewords without the parity may cover the message so that any two stuck message bits may be properly masked. For example, when the parity is at the front of the codewords, the positions of the codeword covered by mask 0–mask M–1 may handle any two stuck bits positions in the message.

To ensure that all positions of the message are covered by positions in the encoded masks without the parity, controller 108 may obtain extra masks by shifting codes 202. Controller 108 may cyclically shift each codeword including mask 0–mask M–1 three times, as shown in sections 204, 206 and 208, to obtain a set of masks that are codewords 202 and that cover all the stuck bit combinations. For example, controller 108 may shift codewords 202 such that parity may be at the end and any two stuck message bits may be properly masked by positions in the masks without the parity, as shown in section 206. In this case, the first k bits of the message may be handled by mask 0–mask M−1.

It may be possible to have two stuck bits wherein one struck bit may be in the beginning of the codeword, and one stuck bit may be at the end, and neither of which may be covered by the codewords 202 in sections 204 and 206. Controller 108 may shift codewords 202 such that parity may be in the middle so that any two stuck message bits at the front and at the back may be properly masked by positions in the codeword without the parity, as shown in section 208. As indicated above FIG. 2 is provided as an example. Other examples may differ from what is described in FIG. 2.

Figure 3:
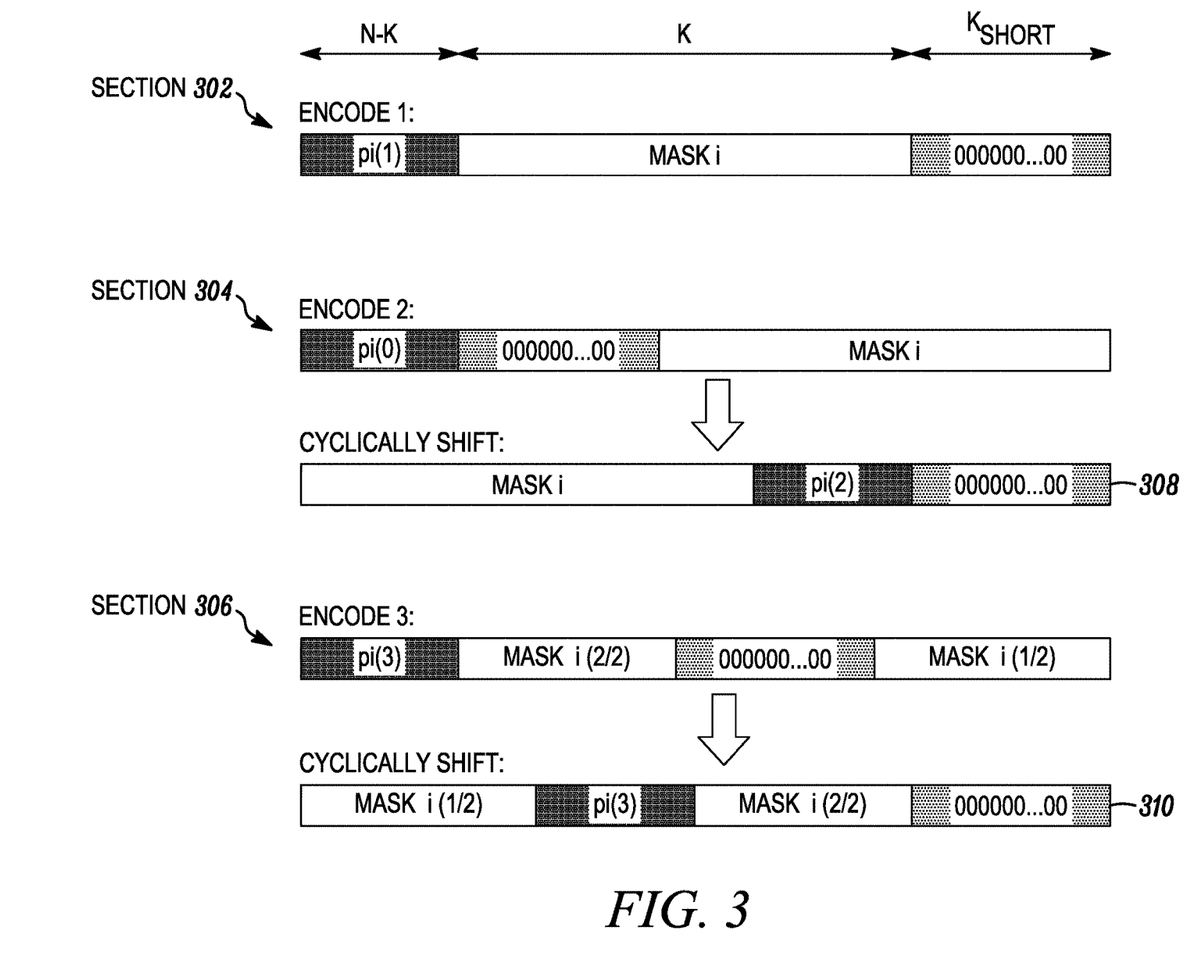
FIG. 3 shows an example of masks encoded to produce shortened codes in accordance with some embodiments.

FIG. 3 shows an example of masks encoded to produce shortened codes in accordance with some embodiments. Controller 108 may encode each mask (i) three times. During the first encoding, shown in section 302, controller 108 may encode the mask (i) by adding a first parity (pi (1)) to the front of mask (i), such that the first n–k bits may have the first parity and the remaining k bits may have mask (i). Unused bits in mask (i) may be of a length $k_{short}$ wherein those unused bits may have zeros and may be unused on memory device 110.

During the second encoding, as shown in section 304, controller 108 may encode mask (i) by adding a second parity (pi (2)) to the front of mask (i), the unused bits of length $k_{short}$ after the second parity, and the mask after the unused bits. When codeword 308 produced during the second encoding is cyclic shifted, mask (i) may be at the front of shortened codeword 308, and the second set of parity may be at the back of shortened codeword 308.

During the third encoding, as shown in section 306, controller 108 may encode each mask (i) by dividing mask (i) into two. Controller 108 may encode mask (i) by adding a third parity (pi (3)), the second half of mask (i) after the third parity, the unused bits of length $k_{short}$ after the second half of mask (i), and the first half of the mask after the unused bits. When codeword 310 produced during the third encoding is cyclic shifted, the first half of the mask, the third parity, and the second half of the mask may cover the shortened codeword. The first, second, and third parity used from shortened codes may have different values. As indicated above FIG. 3 is provided as an example. Other examples may differ from what is described in FIG. 3.

Figure 4:
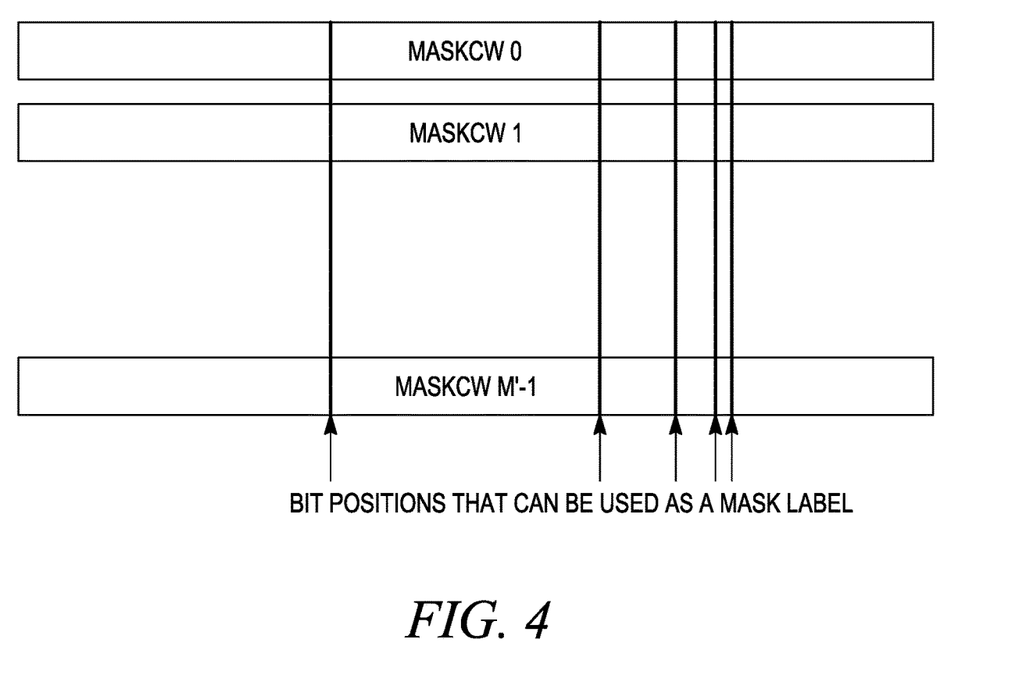
FIG. 4 shows an example of messages including labels in accordance with some embodiments.

FIG. 4 shows an example of messages including labels in accordance with some embodiments. Controller 108 may store a predefined number (l) of label bits among message bits. Controller 108 may reduce the message portion by l and use l bits as labels in the masks. When, for example, l is five, controller 108 may generate labels for thirty-two masks such that each mask label may have a different value and each mask may have a different label. As indicated above FIG. 4 is provided as an example. Other examples may differ from what is described in FIG. 4.

Figure 5:
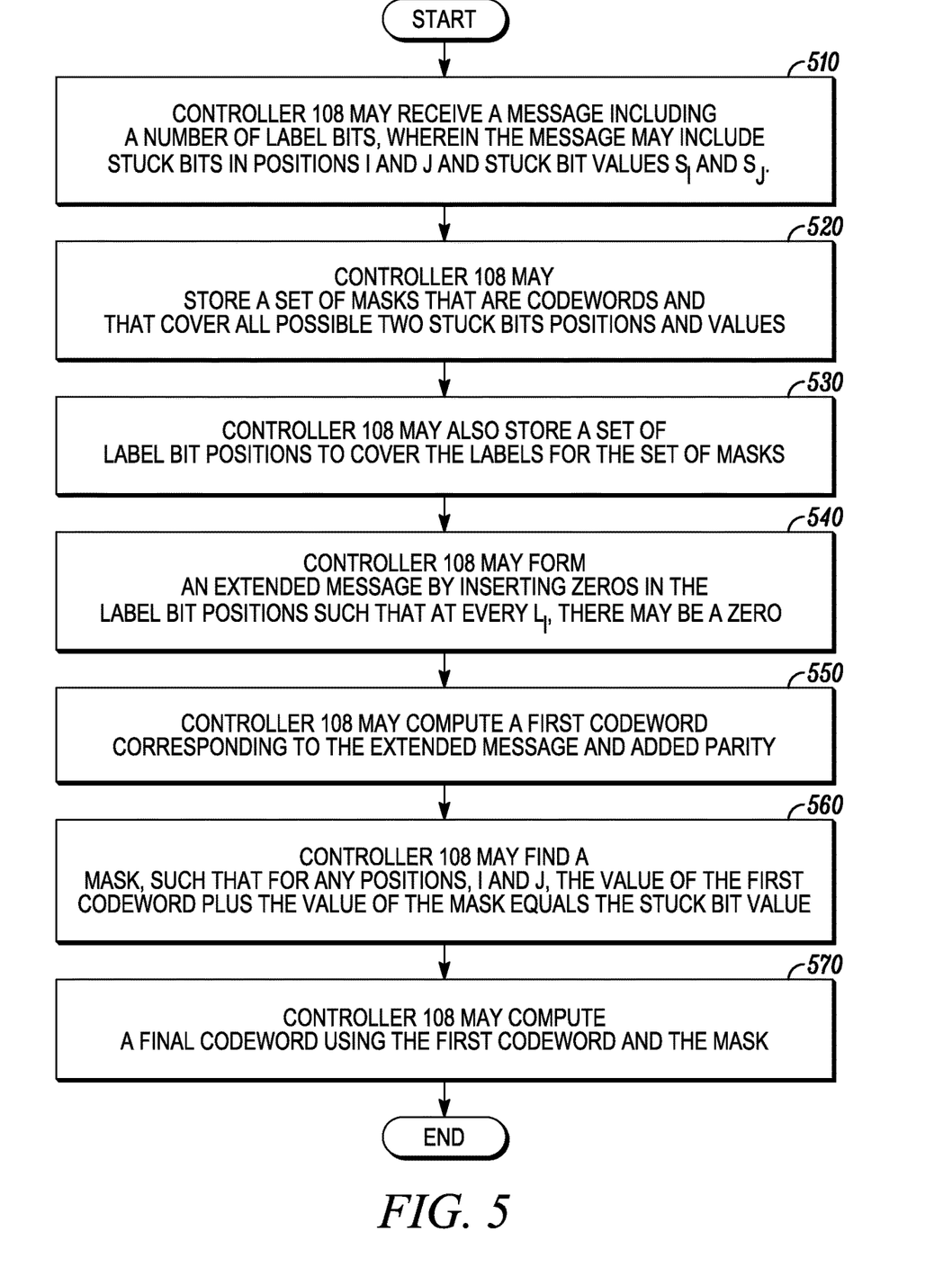
FIG. 5 is an example flow diagram of an encoding operation carried out by the controller using the full length codewords and the shortened codewords in accordance with some implementations.

FIG. 5 is an example flow diagram of an encoding operation carried out by the controller using the full length codewords and the shortened codewords in accordance with some implementations. At 510, controller 108 may receive a message including a number of label bits that may add additional redundancy, wherein the message may include stuck bits in positions i and j and stuck bit values $s_i$ and $s_j$. At 520, controller 108 may store a set of masks that are codewords and that cover all possible two stuck bits positions and values. At 530, controller 108 may also store a set of label bit positions to cover the labels for the set of masks. At 540, controller 108 may form an extended message by inserting zeros in the label bit positions such that at every i, there may be a zero.

At 550, controller 108 may compute a first codeword corresponding to the extended message and added parity. At 560, controller 108 may find a mask, such that for any positions, i andj, the value of the first codeword plus the value of the mask equals the stuck bit value. At 570, controller 108 may compute a final codeword using the first codeword and the mask. As indicated above FIG. 5 is provided as an example. Other examples may differ from what is described in FIG. 5.

Figure 6:
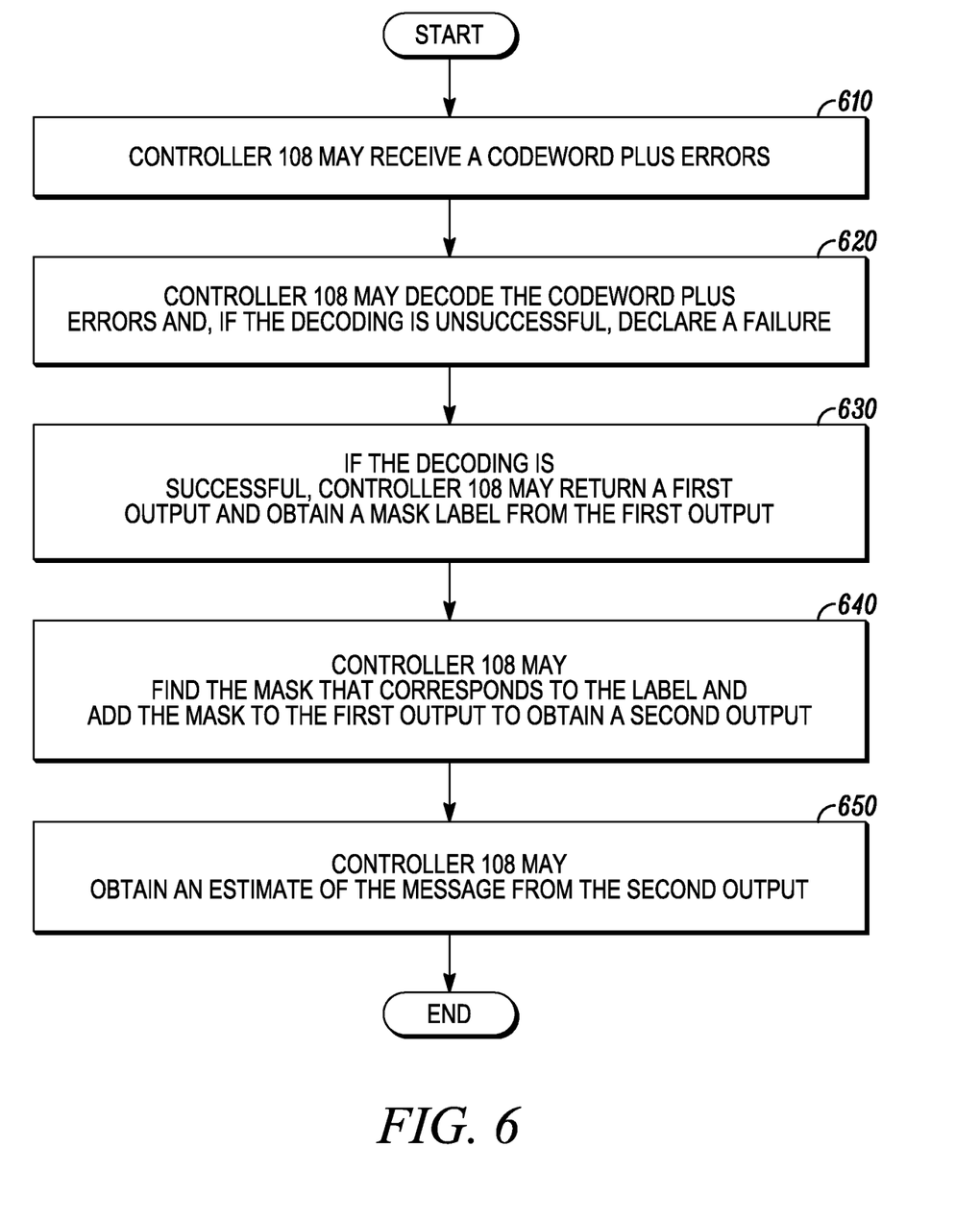
FIG. 6 is an example flow diagram of a decoding operation carried out by the controller using the full length codewords and the shortened codewords in accordance with some implementations.

FIG. 6 is an example flow diagram of a decoding operation carried out by the controller using the full length codewords and the shortened codewords in accordance with some implementations. At 610, controller 108 may receive a codeword plus errors. At 620, controller 108 may decode the codeword plus errors and, if the decoding is unsuccessful, declare a failure. At 630, if the decoding is successful, controller 108 may return a first output and obtain a mask label from the first output. At 640, controller 108 may find the mask that corresponds to the label and add the mask to the first output to obtain a second output. At 650, controller 108 may obtain an estimate of the message from the second output. As indicated above FIG. 6 is provided as an example. Other examples may differ from what is described in FIG. 6.

Figure 7:
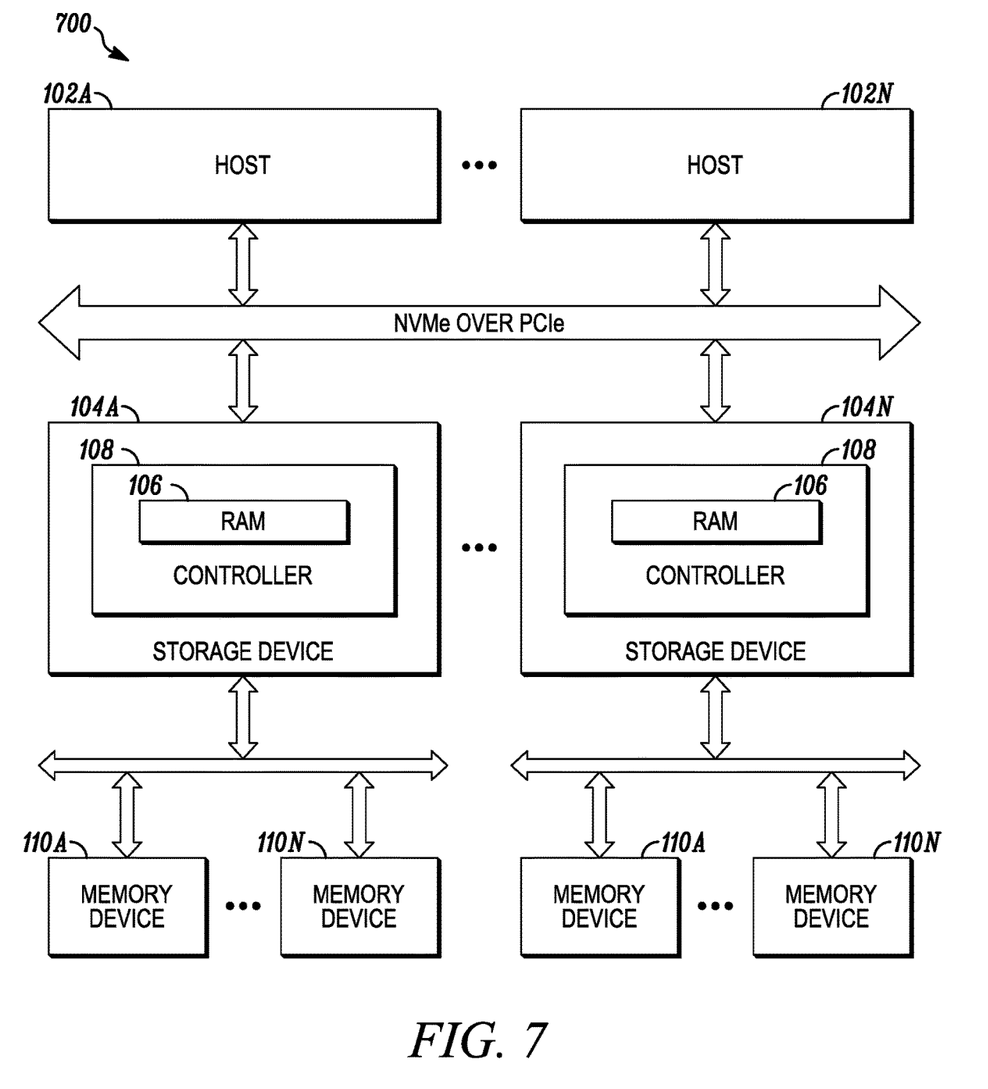
FIG. 7 is a diagram of an example environment in which systems and/or methods described herein are implemented.

FIG. 7 is a diagram of an example environment in which systems and/or methods described herein are implemented. As shown in FIG. 7, Environment 700 may include hosts 102-102n (referred to herein as host(s) 102), and storage devices 104a-104n (referred to herein as storage device(s) 104).

Storage device 104 may include a controller 108 to process stuck bits when writing data to memory device 110 and reading the data from memory device 110. Controller 108 may also process free stuck bits information by building an optimal number of decoding masks including an encoding mask using a solving engine. Hosts 102 and storage devices 104 may communicate via a Serial AT attachment (SATA) interface, Non-Volatile Memory Express (NVMe) over peripheral component interconnect express (PCI Express or PCIe) interface, the Universal Flash Storage (UFS) over Unipro, or the like.

Devices of Environment 700 may interconnect via wired connections, wireless connections, or a combination of wired and wireless connections. For example, the network of FIG. 7 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of Environment 700 may perform one or more functions described as being performed by another set of devices of Environment 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a." and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to minimize redundancy for stuck bit codes when writing a message to a memory device and reading the message from the memory device, the storage device comprises:
   one or more processors configured, individually or in combination, to:
      generate a set of masks that are codewords and that include values that correspond to stuck bit values, wherein the set of masks includes one of full length codewords and shortened codewords;
      receive a message including a predefined number of label bits and determine that a location in the memory device where the message is to be stored includes two stuck bits, encode the message to produce a first message codeword, locate a mask from the set of masks, wherein when the mask is added to the first message codeword, any two stuck message bits are masked, compute a final message codeword using the first message codeword and the mask, and store the final message codeword on the memory device; and
      retrieve the final message codeword and errors from the memory device, decode the final message codeword to retrieve an output, obtain a mask label from the output, use the mask label to retrieve the mask, and apply the mask to the output to retrieve the message.

2. The storage device of claim 1, wherein the one or more processors are configured, individually or in combination, to form an extended message by inserting zeros in label bit positions and to compute the first message codeword by adding parity to the extended message.

3. The storage device of claim 1, wherein the mask label is a unique label that identifies the mask in the set of masks.

4. The storage device of claim 1, wherein for full length codewords, the one or more processors are configured, individually or in combination, to encode masks in the set of masks by adding parity to the masks such that a first predefined number of bits of a codeword has the parity and a remaining number of bits of the codeword has the mask so that positions in the codeword without the parity cover the message.

5. The storage device of claim 4, wherein the one or more processors are configured, individually or in combination, to cyclically shift each codeword three times to obtain the codewords that cover stuck bit combinations.

6. The storage device of claim 1, wherein for shortened codewords, the one or more processors are configured, individually or in combination, to encode masks in the set of masks three times, wherein
   during a first encoding the one or more processors configured, individually or in combination, to encode a mask by adding a first parity to a front of the mask such that a first predefined number of bits of a codeword has the parity and a remaining number of bits of the codeword has the mask and the remaining number of bits includes an unused portion;
   during a second encoding the one or more processors are configured, individually or in combination, to encode the mask by adding a second parity to the front of the mask, a number of unused bits after the second parity, and the mask after the unused bits, wherein when the codeword is cyclic shifted, the mask may be at the front of the shortened codeword and the second parity may be at a back of the shortened codeword; and during a third encoding the one or more processors are configured, individually or in combination, to encode the mask by dividing the mask into two, adding a third parity to the front of a second half of the mask, the number of unused bits after the second half of the mask, and a first half of the mask after the unused bits, wherein when the codeword is cyclic shifted, the first half of the mask may be at the front of a shortened codeword followed by the third parity and the second half of the mask.

7. The storage device of claim 1, wherein the one or more processors are configured, individually or in combination, to perform a search to remove unnecessary masks and reduce a total number of masks in the set of masks and to store the set of masks.

8. The storage device of claim 1, wherein the one or more processors are configured, individually or in combination, to store a set of label positions to cover labels for the set of masks.

9. A method for minimizing redundancy for stuck bit codes when writing a message to a memory device communicatively coupled to a storage device, the storage device comprises a controller to execute the method comprising:

generating a set of masks that are codewords and that include values that correspond to stuck bit values, wherein the set of masks includes one of full length codewords and shortened codewords;

receiving a message including a predefined number of label bits and determining that a location in the memory device where the message is to be stored includes two stuck bits;

encoding the message to produce a first message codeword;

locating a mask from the set of masks wherein when the mask is added to the first message codeword, any two stuck message bits are masked;

computing a final message codeword using the first message codeword and the mask; and storing the final message codeword on the memory device.

10. The method of claim 9, wherein the encoding comprises forming an extended message by inserting zeros in label bit positions and computing the first message codeword by adding parity to the extended message.

11. The method of claim 9, wherein for the full length codewords the method comprises encoding masks in the set of masks by adding parity to the masks such that a first predefined number of bits of a codeword has the parity and a remaining number of bits of the codeword has the mask so that positions in the codeword without the parity cover the message.

12. The method of claim 9, wherein generating the full length codewords comprises cyclically shifting each codeword three times to obtain the codewords that cover stuck bit combinations.

13. The method of claim 9, wherein for the shortened codewords, the method comprises encoding masks in the set of masks three times.

14. The method of claim 13, further comprising during a first encoding, the method comprises encoding the mask by adding a first parity to a front of the mask such that a first predefined number of bits of a codeword has the parity and a remaining number of bits of the codeword has the mask and the remaining number of bits includes an unused portion.

15. The method of claim 13, further comprising during a second encoding, the method comprises encoding the mask by adding a second parity to a front of the mask, a number of unused bits after the second parity, and the mask after the unused bits, wherein when the codeword is cyclic shifted, the mask may be at the front of the shortened codeword and the second parity may be at a back of the shortened codeword.

16. The method of claim 13, further comprising during a third encoding, the method comprises encoding the mask by dividing the mask into two, adding a third parity to a front of a second half of the mask, the number of unused bits after the second half of the mask, and a first half of the mask after the unused bits, wherein when the codeword is cyclic shifted, the first half of the mask may be at the front of a shortened codeword followed by the third parity and the second half of the mask.

17. The method of claim 9, further comprising performing a search to remove unnecessary masks and reduce a total number of masks in the set of masks and storing the set of masks.

18. The method of claim 9, further comprising storing a set of label positions to cover labels for the set of masks.

19. A method for minimizing redundancy for stuck bit codes when retrieving a message from a memory device communicatively coupled to a storage device, the storage device comprises a controller to execute the method comprising:

generating a set of masks that are codewords and that include values that correspond to stuck bit values, wherein the set of masks includes one of full length codewords and shortened codewords;

retrieving a message codeword and errors from the memory device;

decoding the message codeword to retrieve an output;

obtaining a mask label from the output;

using the mask label to retrieve a mask from the set of masks; and applying the mask to the output to retrieve a message.

* * * * *